United States Patent
Hawes et al.

(10) Patent No.: US 9,595,903 B2
(45) Date of Patent: Mar. 14, 2017

(54) CONTROLLER FOR MOTOR

(71) Applicant: GENERAL ELECTRIC COMPANY, Schenectady, NY (US)

(72) Inventors: Nathaniel Benedict Hawes, Milton, NY (US); David Allan Torrey, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/663,691

(22) Filed: Mar. 20, 2015

(65) Prior Publication Data
US 2016/0276970 A1    Sep. 22, 2016

(51) Int. Cl.
| | |
|---|---|
| H02H 7/08 | (2006.01) |
| H02P 23/06 | (2016.01) |
| H02P 23/14 | (2006.01) |
| F04B 47/06 | (2006.01) |
| H02P 6/08 | (2016.01) |
| H02P 6/18 | (2016.01) |

(52) U.S. Cl.
CPC ........... *H02P 23/065* (2013.01); *F04B 47/06* (2013.01); *H02P 6/08* (2013.01); *H02P 6/182* (2013.01); *H02P 6/183* (2013.01); *H02P 23/14* (2013.01)

(58) Field of Classification Search
CPC .............................. H02P 23/065; H02P 23/14
USPC ..................................................... 318/400.21
See application file for complete search history.

(56) References Cited

U.S. PATENT DOCUMENTS

| | | | | |
|---|---|---|---|---|
| 4,740,738 A | * | 4/1988 | El-Antably | ............. H02P 3/065 318/701 |
| 4,926,105 A | * | 5/1990 | Mischenko | ............. H02P 21/06 318/800 |
| 6,462,492 B1 | | 10/2002 | Sakamoto et al. | |
| 6,552,509 B2 | | 4/2003 | Veltman | |

(Continued)

FOREIGN PATENT DOCUMENTS

CN        103607155 A     2/2014

OTHER PUBLICATIONS

Lian et al, "LMI-Based Sensorless Control of Permanent-Magnet Synchronous Motors", Industrial Electronics, IEEE Transactions, pp. 2769-2778, vol. 54, Issue: 5, Oct. 2007.

(Continued)

*Primary Examiner* — Erick Glass
(74) *Attorney, Agent, or Firm* — Andrew J. Caruso

(57) ABSTRACT

A controller is provided which can interface with a variable frequency drive and a motor, the controller having (a) one or more voltage and current sensors which can interface with a power line linking the variable frequency drive and the motor; and (b) a signal interface module which can receive electrical signals associated with an operating condition of the motor from the one or more voltage and current sensors. The signal interface module can correlate the received electrical signals with a rotor position of the motor, and transmit signals corresponding to rotor position, to the variable frequency drive. The data provided by the controller if conveyed as a rotor position, may cause the variable frequency drive to change one or more of its operating parameters to maintain proper synchronization of the rotor and its associated stator currents. Alternatively, the controller may directly control variable frequency drive operating parameters.

26 Claims, 5 Drawing Sheets

(56) References Cited

U.S. PATENT DOCUMENTS

| | | |
|---|---|---|
| 6,586,898 B2 | 7/2003 | King et al. |
| 6,788,021 B2 | 9/2004 | Sozer et al. |
| 6,822,418 B2 | 11/2004 | Harke |
| 6,825,646 B2 | 11/2004 | Colombo |
| 6,850,021 B1 | 2/2005 | Golownia et al. |
| 6,967,461 B1 | 11/2005 | Markunas et al. |
| 7,098,623 B2 | 8/2006 | Piippo |
| 7,230,398 B2 | 6/2007 | Miyauchi |
| 7,271,562 B2 | 9/2007 | Lee et al. |
| 7,294,988 B2 | 11/2007 | Ajima et al. |
| 7,417,392 B2 | 8/2008 | Wirtz et al. |
| 7,486,041 B2 | 2/2009 | Wasson et al. |
| 7,560,894 B2 | 7/2009 | Salomaeki et al. |
| 7,602,139 B2 | 10/2009 | Ho |
| 7,759,897 B2 | 7/2010 | Piippo |
| 8,159,168 B2 | 4/2012 | Liu et al. |
| 8,217,605 B2 | 7/2012 | Balazovic et al. |
| 8,232,757 B2 | 7/2012 | Sasaki |
| 8,242,721 B2 | 8/2012 | Kwon et al. |
| 8,310,189 B2 | 11/2012 | Patel et al. |
| 8,339,081 B2 | 12/2012 | Patel et al. |
| 8,362,728 B2 | 1/2013 | Patel et al. |
| 8,466,647 B2 | 6/2013 | Lee et al. |
| 8,487,575 B2 | 7/2013 | Yeh et al. |
| 8,587,250 B2 | 11/2013 | Villwock et al. |
| 8,593,095 B2 | 11/2013 | Markunas et al. |
| 8,604,745 B2 | 12/2013 | Villwock et al. |
| 8,664,906 B2 | 3/2014 | Hirono |
| 8,674,638 B2 | 3/2014 | Balazovic et al. |
| 9,054,621 B2 * | 6/2015 | Liu .................... H02P 21/0003 |
| 2011/0012544 A1 * | 1/2011 | Schulz ................ B60L 15/025 |
| | | 318/400.02 |

OTHER PUBLICATIONS

Gamazo-Real et al, "Position and Speed Control of Brushless DC Motors Using Sensorless Techniques and Application Trends", Sensors, pp. 6901-6947, Jul. 19, 2010.

* cited by examiner

CONTROLLER FOR MOTOR

The present invention relates to enhanced control of a motor operationally linked to a variable frequency drive. In particular, the invention provides controllers, systems and methods to enhance performance of a motor powered by a variable frequency drive.

BACKGROUND

A variety of conventional electric motor-driven equipment systems are powered by variable frequency drives. In many applications, the variable frequency drive cannot be located adjacent to the equipment being driven. For example, an electric submersible pump used in hydrocarbon production may be separated from its associated variable frequency drive by thousands of feet of electric cable. Such wide separation generally demands the use of a filter on the output of the variable frequency drive. Further, a transformer is commonly used to step up the voltage in an effort to minimize the cable size. A long sought goal has been to increase a motor's power density (power per unit length) and equipment efficiency. One way to realize such higher equipment efficiencies is through the use of permanent magnet motors which achieve higher power density relative to a correspondingly sized induction motor. Relative to an induction motor, permanent magnet motors present especially difficult control problems. For example, efficient operation of the permanent magnet motor requires knowledge of the rotor position for proper synchronization with the stator currents. Commonly, a permanent magnet motor will use an angular position sensor, such as an encoder or resolver, in order to monitor the rotor position, at times referred to as the rotor angle. The rotor position data is transmitted from the motor to the variable frequency drive which uses the data to maintain proper synchronization of the rotor. However, for equipment deployed at a distance from the variable frequency drive and due to the frequently harsh conditions in which the equipment must operate, a physical sensor is un-attractive and additional options are needed because it is not practical to use a physical rotor position sensor under such circumstances.

An alternative to using a position feedback sensor located within the motor is to use detailed knowledge of the motor operating characteristics coupled with motor current and voltage measurements to estimate the rotor angle. These techniques are known as "sensorless" control techniques and in practice are typically very difficult to implement. Moreover, different models of variable frequency drives exhibit varying levels of ability to perform sensorless control. In some instances, a motor must be paired with a specific type of variable frequency drive as only certain variable frequency drives available in the marketplace may be compatible with a particular motor. As a result, motor performance may vary considerably depending on the variable frequency drive selected. As a practical matter, since the life expectancy of a motor deployed in a harsh environment may be considerably shorter than the life expectancy of the variable frequency drive which powers the motor, oil field operators would benefit if greater interchangeability could be achieved between different motors and available variable frequency drives. While the technical challenges discussed here apply to electric motors generally, they are particularly problematic when permanent magnet motors are involved because of the necessity of synchronizing stator currents with rotor position. Such uncertainty poses an obstacle for market adoption of equipment comprising permanent magnet motors despite the gains in operational efficiency conferred by the presence of the permanent magnet motor. Thus, there remains a need to further enhance the ease with which a variable frequency drive may be used to power a motor.

BRIEF DESCRIPTION

In one embodiment, the present invention provides a controller configured to interface with a variable frequency drive and a motor, the controller comprising: (a) one or more voltage and current sensors configured to interface with a power line linking the variable frequency drive and the motor; and (b) a signal interface module configured to receive one or more electrical signals associated with an operating condition of the motor from the one or more voltage and current sensors, the signal interface module being configured to correlate the received electrical signals with a rotor position of the motor, and to transmit signals corresponding to rotor position or variable frequency drive operating commands, to the variable frequency drive.

In an alternate embodiment, the present invention provides a system comprising: a variable frequency drive linked via a power line to a motor; and a controller interfacing with the variable frequency drive and the motor, the controller comprising: (a) one or more voltage and current sensors interfaced with the power line linking the variable frequency drive and the motor; and (b) a signal interface module configured to receive one or more electrical signals associated with an operating condition of the motor from the one or more voltage and current sensors, the signal interface module being configured to correlate the received electrical signals with a rotor position of the motor, and to transmit signals corresponding to the rotor position or variable frequency drive operating commands to the variable frequency drive.

In yet another embodiment, the present invention provides a method of operating a motor driven by a variable frequency drive, the method comprising: (a) receiving at a signal interface module of a controller interfaced with the variable frequency drive and the motor, one or more electrical signals associated with an operating condition of the motor from one or more power line voltage and current sensors interfaced with a power line linking the variable frequency drive and the motor, the signal interface module being configured to correlate the received electrical signals with a rotor position of the motor, and to transmit signals corresponding to the rotor position or variable frequency drive operating commands to the variable frequency drive; and (b) changing one or more operating parameters of the variable frequency drive in response to the signal transmitted by the controller to the variable frequency drive.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
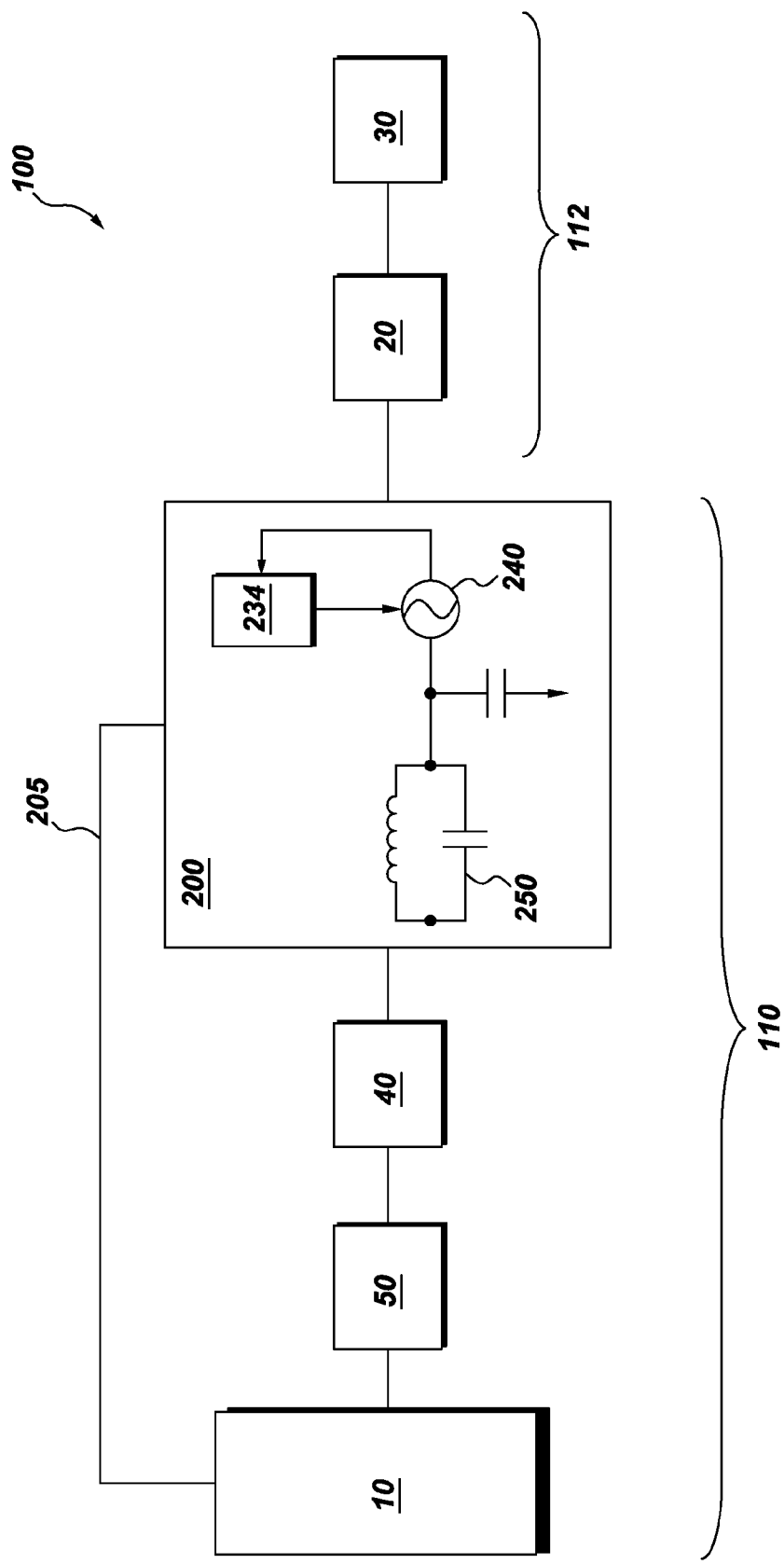
FIG. 1 illustrates a system provided by the present invention.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Variable frequency drives have varying sensorless detection and control capabilities, depending on the variable frequency drive design and the motor being driven. Nonetheless, variable frequency drives typically exhibit appropriate control responses when presented with rotor position data from a physical sensor connected to, or located within, the motor. In one or more embodiments, the present invention provides a controller capable of sensorless detection of a motor characteristic such as rotor position and of conveying the detected motor characteristic to the variable frequency drive. The variable frequency drive then responds by applying the appropriate control responses (at times herein referred to as control response commands) to the power cable linking the variable frequency drive to the motor. In this manner, the operational efficiency of the motor is not limited by the sensorless detection capabilities of the variable frequency drive, which may vary considerably. Instead, enhanced operational efficiency relies upon the controller provided by the present invention to act as the sensorless detector component and to supply the necessary motor data upon which the variable frequency drive control commands are based, and to do so in a format understood by the variable frequency drive.

In one or more embodiments the controller interfaces with the power cable (at times herein referred to as a power line) linking the variable frequency drive and the motor. The controller uses sensorless control algorithms in conjunction with current and/or voltage measurements taken from the power cable to determine the rotor position. The controller then relays this position information to the variable frequency drive in a format understood by the variable frequency drive. In one or more embodiments rotor position data is relayed to the variable frequency drive in a format mimicking the output of resolver or an encoder. In operation, the variable frequency drive responds as though it were driving the motor using a closed-loop position sensor, when in fact, it is the controller which detects the rotor position and then acts as a "virtual encoder" (or "virtual resolver").

In one or more embodiments, the controller comprises one or more voltage and current sensors configured to interface with the power line, and these sensors provide the voltage and current measurements needed to determine the rotor position. The sensors are placed in close enough proximity to the power line such that variations in line current and voltage are readily detected. A wide variety of such sensors are commercially available and known to those of ordinary skill in the art. Suitable voltage and current sensors include optical and Hall-effect devices that provide information while maintaining galvanic isolation. The voltage and current sensors may be linked to other components of the controller via any means by which the electrical signals detected by the sensors may be transmitted, for example by an analog signal transmission cable such as a coaxial cable.

The controller comprises a signal interface module linked to the voltage and current sensors. The signal interface module receives one or more electrical signals associated with an operating condition of the motor from the one or more voltage and current sensors. Typically, the operating condition of principal interest is the rotor position, although other operating conditions of the motor may be both detectable and of interest, for example motor torque or air gap flux. The signal interface module is configured to correlate the signals received from the voltage and current sensor with the rotor position and to transmit one or more signals corresponding to the rotor position to the variable frequency drive.

In one or more embodiments, correlation of the signals received from the voltage and current sensors with the rotor position is carried out using one or more of a "Back-EMF Tracking" or a "Back-EMF Estimation" methodology. For example, the controller functioning as a virtual encoder measures the power-line currents and voltages, computes the difference between an estimated current and an actual current to determine the motor back-emf voltage. The direct axis (d-axis) voltage due to the stator field is then corrected. Since the controller assumes that the magnet field is along the d-axis, whatever d-axis voltage remains must be due to an error in rotor angle. A compensator is then applied to drive the corrected d-axis voltage to zero by adjusting the angle. The rotor angle information is then transmitted to the variable frequency drive as one or more quadrature controller output signals. A suitable example of a back-emf estimation algorithm is given in S. Morimotto et al., "Sensorless Control Strategy for Salient-Pole PMSM Based on Extended EMF in Rotating Reference Frame," IEEE Trans. Ind. Appl., vol. 38, pp 1054-1061, 2002. Typically, back-emf tracking methods cannot provide low and zero-speed rotor position information because there is insufficient signal. To enable low speed and zero speed detection of rotor position, the controller may be equipped with a signal injection module configured to inject one or more probe signals into the power line linking the variable frequency drive and the motor. In one or more embodiments, the signal injection module comprises a switching network and a capacitive or inductive power line coupling. Various configurations of the signal injection module are possible and these include, but are not limited to configurations enabling one or more of parallel inductive signal injection, series inductive signal injection, parallel capacitive signal injection, series direct (i.e. no coupling element), and parallel direct, individually or in combination. In one or more alternate embodiments, the signal injection module is configured for direct injection of the probe signal into the power line.

Thus, in one or more embodiments, the signal injection module is configured such that a probe signal having known voltage and frequency characteristics may be injected into the power line at a frequency much greater than the fundamental electrical frequency (and its low order harmonics) powering the motor. This creates a high frequency current signal which may be measured as part of a voltage and current sensor package interfaced with the power line. The motor inductance can thereby be computed and, due to motor saliency, the rotor angle information can be derived, thus correlating the high frequency current signal received from the motor with the rotor position. The controller may include one or more filters to prevent probe signals injected into the power line by the controller signal injection module from affecting the variable frequency drive or allied system components. In one or more embodiments the controller comprises at least one high frequency band-stop filter. In one or more embodiments, the controller comprises a plurality of high frequency filters installed on the power line between the signal injection module and the controller interface with the variable frequency drive or other system component. This configuration ensures that the high frequency voltage probe signals drive currents only in the motor and not in the variable frequency drive or other system component such as a low pass filter. A suitable example of a high-frequency injection based algorithm is given in M. J. Corley and R. D. Lorenz, "Rotor Position and Velocity Estimation for a Salient-Pole Permanent Magnet Synchronous Machine at Standstill and High Speeds," IEEE Trans. Ind. Appl., vol. 34, pp. 784-789, 1998.

As noted, in one or more embodiments the controller is equipped to calculate the rotor angle and transmit such position information to the variable frequency drive in a format understood by the variable frequency drive. In such embodiments, the variable frequency drive itself is pre-programmed to respond appropriately to the rotor position information to maintain synchrony between the rotor position and stator currents. Appropriate signal formats include resolver-like (sin/cos) signals and encoder-like (quadrature) signals which can be transmitted to the variable frequency drive via a signal interface output submodule. (See, for example, element labeled 236 and 236a-c in FIG. 2.) When the rotor position information is transmitted to the variable frequency drive as a sinusoidal controller output signal, the controller may be said to mimic a resolver. When the rotor position information is transmitted to the variable frequency drive as a quadrature controller output signal, the controller may be said to mimic an encoder. Under such circumstances, the variable frequency drive may be programmed to operate in a "closed-loop" or "sensor feedback" control mode.

In one or more embodiments, the controller provided by the present invention may be employed to control a variable frequency drive which is not configured to apply appropriate control responses when presented with rotor position data alone. Under such circumstances, the controller may be programmed to transmit drive operating commands corresponding to the rotor position data, directly to the variable frequency drive, and the controller acts essentially as a master controller performing both the rotor position sensing function and controlling power input by the variable frequency drive into the power line linked to the motor. In one or more embodiments in which the controller acts as such a master controller, the signal interface module may comprise one or more output submodules configured to send one or more analog or digital controller output signals to the variable frequency drive. (See, for example, element 236c of FIG. 2.)

As noted, in one or more embodiments the present invention provides a system comprising one or more of the controllers disclosed herein. The system comprises a variable frequency drive linked via a power line to a motor. In one or more embodiments the motor is a permanent magnet motor. In one or more alternate embodiments, the motor is an induction motor. The controller interfaces with the variable frequency drive and the motor via the power line and includes a signal interface module configured to receive one or more electrical signals associated with an operating condition of the motor from one or more controller voltage and current sensors. The signal interface module is configured to correlate the received electrical signals with a rotor position of the motor, and to transmit signals corresponding to the rotor position to the variable frequency drive. In one or more embodiments, the system includes a filter and a transformer disposed between the variable frequency drive and the controller.

In one or more embodiments, the system provided by the present invention is used in conjunction with an electric submersible pump, the system's motor being a component of the electric submersible pump. In one or more embodiments, mechanical power is supplied to the submersible pump from a permanent magnet motor linked to the variable frequency drive via the controller. In one or more alternate embodiments, mechanical power is supplied to the submersible pump from an induction motor linked to the variable frequency drive via the controller.

In one or more embodiments, the present invention provides a method of operating a motor driven by a variable frequency drive. The method employs one or more of the novel controllers disclosed herein. Thus, in one or more embodiments, the signal interface module of the controller receives one or more electrical signals associated with an operating condition of the motor from a controller voltage and current sensor interfaced with the power line linking the variable frequency drive to the motor. The signal interface module then correlates the one or more electrical signals received from voltage and current sensor with a rotor position as detailed herein, and transmits one or more signals corresponding to the rotor position to the variable frequency drive. In response to the one or more signals received from the controller, one or more operating parameters of the variable frequency drive are changed. The changes in the operating parameters of the variable frequency drive may be effected by the variable frequency drive itself in response to receiving rotor position information from the controller, the controller acting as a virtual encoder or virtual resolver. Alternatively, the changes in the operating parameters of the variable frequency drive may be effected in response to variable frequency drive operating commands originating in the controller. In one or more embodiments, variable frequency drive operating commands are received from a controller output submodule as one or more digital controller output signals. In one or more embodiments, the method provided by the present invention is used to operate a permanent magnet motor. In one or more alternate embodiments, the method provided by the present invention is used to operate an induction motor. In yet another set of embodiments, the method provided by the present invention is used to operate a motor configured to provide mechanical power to a pump, for example an electric submersible pump.

Turning now to the figures, FIG. 1 illustrates a system 100 provided by the present invention in which a controller 200 is used in conjunction with a motor 30 being powered by variable frequency drive 10. Controller 200 comprises one or more voltage and current sensors (See element 210, FIG. 2) and interfaces with a power connection linking the variable frequency drive and the motor. In the embodiment shown, a digital signal processor 234 serves as a signal interface module which receives electrical signals associated with an operating condition of the motor from the one or more controller voltage and current sensors (See numbered element 210 in FIG. 2) and correlates the received electrical signals with a rotor position of the motor. In the embodiment shown, digital signal processor 234 also transmits signals corresponding to rotor position, to the variable frequency drive via an output submodule of the signal interface module and a controller signal transmission link 205. Suitable transmission links include cables configured to transmit analog signals when the controller acts as a virtual encoder or virtual resolver, and cables configured to transmit digital signals when the output from the signal interface module is in digital form. A wide variety of analog signal-carrying cables and digital signal-carrying cables are available commercially and are known to those of ordinary skill in the art. Alternatively, communication between the controller and the variable frequency drive may be done wirelessly by using radio communications.

Still referring to FIG. 1, in the system embodiment shown, controller 200 comprises a signal injection module 240 and associated band stop filter 250. As noted, signal injection module 240 may be used to determine rotor position at low or zero rotor speeds. Band stop filter 250 acts to prevent controller probe signals generated by the signal injection module from being transmitted via the power connection into allied components of the system, such as transformer 40, low pass filter 50 and variable frequency drive 10. In one or more embodiments, the variable frequency drive, the low pass filter and the controller are referred to as the surface electrical network designated by numbered element 110 in the embodiment shown in FIG. 1. Under such circumstances, power cable 20 and motor 30 may be referred to as the subsurface electrical network designated by numbered element 112 in the embodiment shown in FIG. 1.

Figure 2:
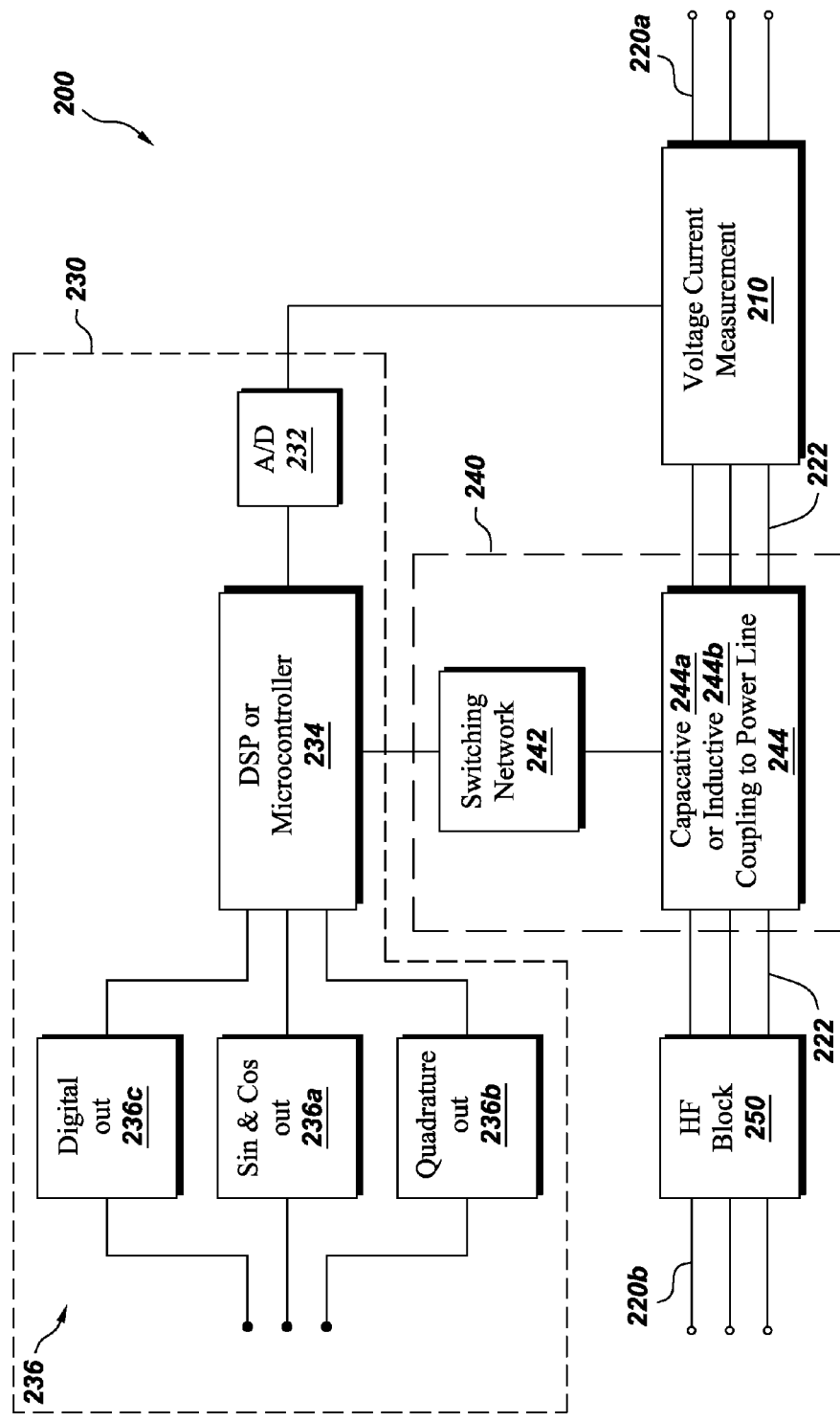
FIG. 2 illustrates a controller provided by the present invention.

Turning now to FIG. 2, the figure illustrates one or more embodiments of a controller 200 provided by the present invention. In the embodiment shown, the controller is configured to interface with a power line via electrical interface 220a and a variable frequency drive via electrical interface 220b and serves as the electrical connection between the variable frequency drive and allied system components on the one hand and the motor driven by the variable frequency drive on the other. One or more voltage and/or current sensors 210 are attached to the controller power transmission cable 222 which extends from interface 220b on the variable frequency drive side of the controller to interface 220a on the motor side of the controller. Voltage and/or current sensor 210 detects line voltages and currents associated with an operating condition of the motor. As noted these electrical signals may include back-electromotive force voltages characteristic of a rotor position, and high frequency current signals resulting from one or more controller injected probe signals. As noted, these high frequency current signals may be measured by voltage and current sensor 210, and such signals can be used by the controller's digital signal processor 234 to compute motor inductance and rotor angle information.

Still referring to FIG. 2, the controller includes a signal interface module 230 comprising the aforementioned digital signal processor 234. In one or more embodiments, signal processor serves as a microcontroller. During operation, electrical signals associated with one or more motor conditions, including rotor position, are transmitted via analog to digital converter 232 to signal processor 234. The digital signal processor is linked to signal output submodule 236. In the embodiment shown, output submodule 236 comprises signal output units 236a, 236b and 236c which are configured to transmit sinusoidal controller output signals, quadrature controller output signals and digital controller output signals respectively, to variable frequency drive controls via one or more signal transmission links. (See, for example, numbered element 205 in FIG. 1.) In one or more embodiments, the controller comprises one or more signal units 236a-236c. For example, in one or more embodiments, a controller provided by the present invention may comprise only signal units 236a and not include signal units of the 236b and 236c types. In one or more alternate embodiments, a controller provided by the present invention may comprise only signal units 236b and not include signal units of the 236a and 236c types. In yet another set of embodiments, signal units of all three types are present. As noted sinusoidal controller output signals and quadrature controller output signals may contain rotor position data which may be processed directly by the variable frequency drive and trigger the appropriate control responses. Similarly, digital controller output signals transmitted by signal unit 236c may comprise rotor position data in a digitized format, or variable frequency drive commands in digital format, as when the controller functions as a master controller.

Still referring to FIG. 2, the controller 200 includes signal injection module 240 comprising switching network 242 and power line coupling 244. During operation a probe signal generated by the digital signal processor 234 is transmitted via switching network 242 to power line coupling 244 which injects the probe signal into the controller power transmission cable 222 and via power line interface 220a and power line 20 (See reference numeral 20, FIG. 1) to a motor being driven by the variable frequency drive. In one or more embodiments, power line coupling 244 is a capacitive coupling (244a). In one or more alternate embodiments, power line coupling 244 is an inductive coupling (244b). In yet another set of embodiments, power line coupling 244 is capable of both capacitive and inductive coupling to controller transmission cable 222. A high frequency signal blocking network 250 prevents injected probe signals from entering the variable frequency drive or allied components via variable frequency drive power interface 220b. In one or more embodiments, blocking network 250 comprises a band stop filter. It should be noted that not all of the controllers provided by the present invention require a signal injection module, but such functionality enhances the versatility of the controller.

In one or more embodiments, the signal injection module 240 is configured for one or more of parallel inductive signal injection, series inductive signal injection, parallel capacitive signal injection, direct series signal injection, and direct parallel signal injection individually or in combination. FIGS. 3-7 illustrate selected embodiments.

Figure 3:
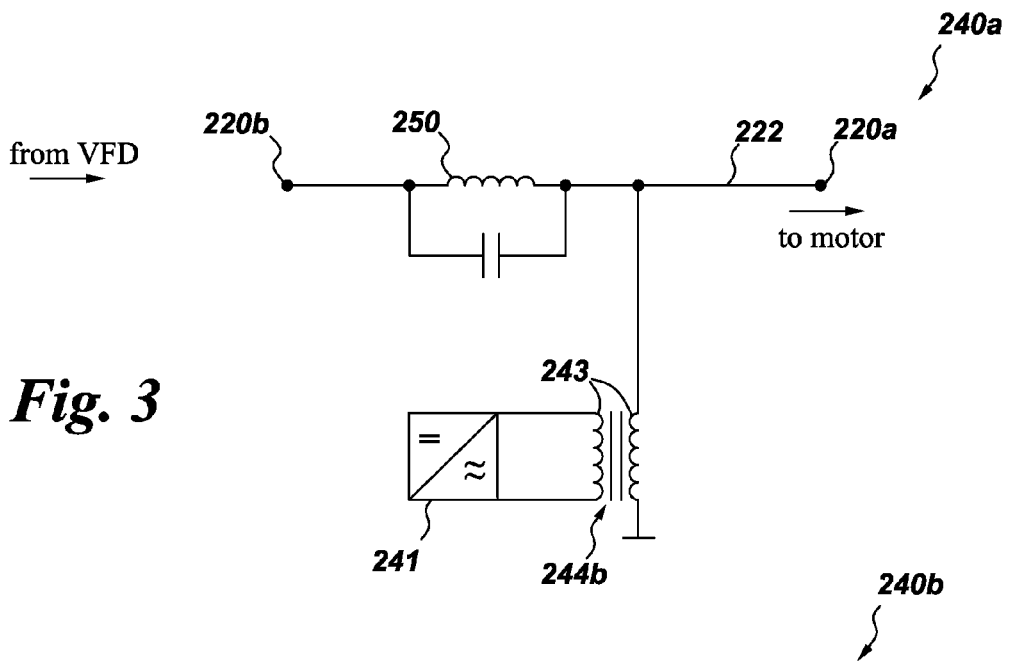
FIG. 3 illustrates a signal injection module useful according to one or more embodiments of the present invention.

Referring to FIG. 3, the figure represents a portion of a signal injection module 240a configured for parallel inductive injection. In the embodiment shown, a voltage source 241 is linked to controller transmission cable 222 through induction coils 243, the induction coils forming an inductive coupling 244b between the signal injection module and the controller power transmission cable 222. A band stop filter 250 inhibits injected signals from reaching the variable frequency drive through interface 220b.

Figure 4:
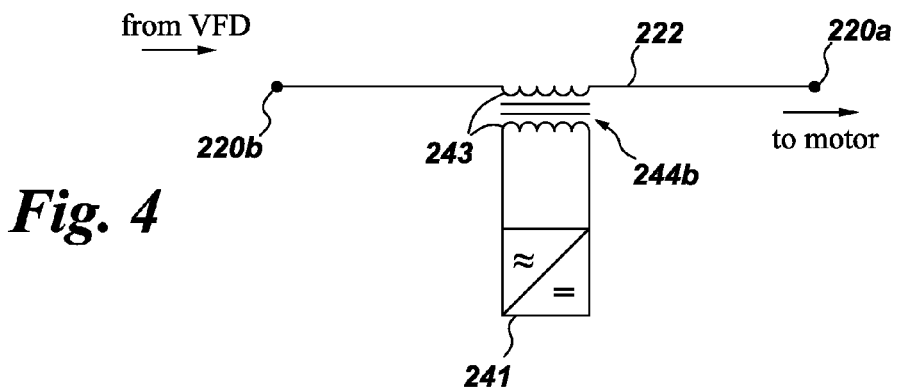
FIG. 4 illustrates a signal injection module useful according to one or more embodiments of the present invention.

Referring to FIG. 4, the figure represents a portion of a signal injection module 240b configured for series inductive injection. In the embodiment shown, a voltage source 241 is linked to controller transmission cable 222 through induction coils 243, the induction coils forming an inductive coupling 244b between the signal injection module and the controller power transmission cable 222.

Figure 5:
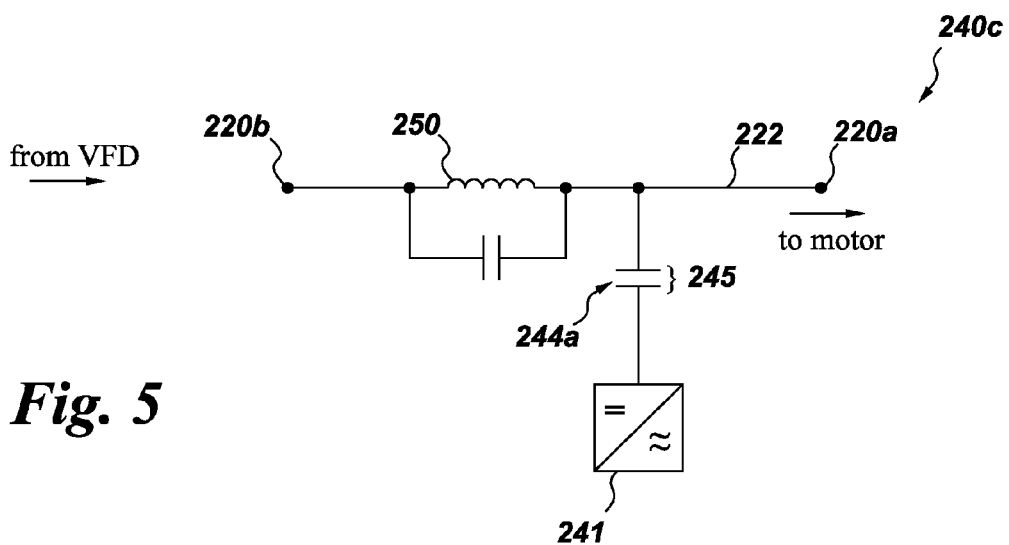
FIG. 5 illustrates a signal injection module useful according to one or more embodiments of the present invention.

Referring to FIG. 5, the figure represents a portion of a signal injection module 240c configured for parallel capacitive injection. In the embodiment shown, a voltage source 241 is linked to controller transmission cable 222 through capacitor 245 forming a capacitive coupling 244a between the signal injection module and the controller power transmission cable 222.

Figure 6:
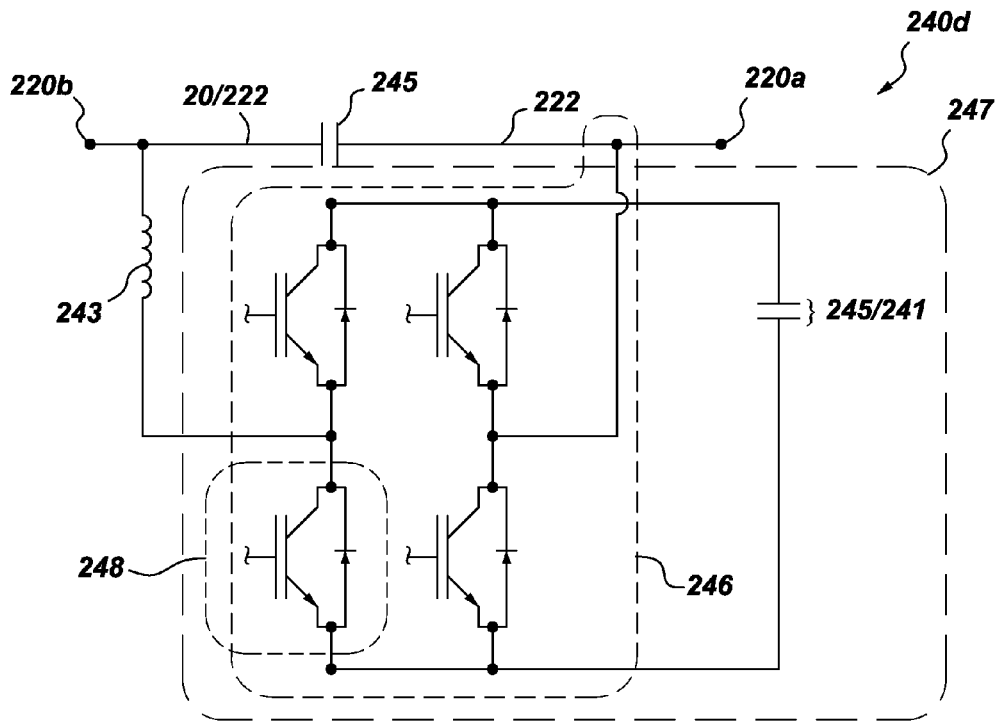
FIG. 6 illustrates a signal injection module useful according to one or more embodiments of the present invention.

Referring to FIG. 6, the figure represents a signal injection module 240d configured for direct series injection of a probe signal into transmission cable 222. In the embodiment shown, the signal injection module comprises direct injection circuitry 246 and energy storage circuitry 247 and is linked directly to controller transmission cable 222. Optional filter elements, inductor coil 243 and transmission cable line capacitor 245 prevent high-frequency switching noise from being transmitted onto transmission cable 222. A second capacitor 245 is a component of energy storage circuitry 247 and sources the electrical power for the signal injection through signal injection circuitry 246. In the embodiment shown, insulated gate bipolar transistors (IGBTs) 248 provide for probe signal voltage and frequency control.

Figure 7:
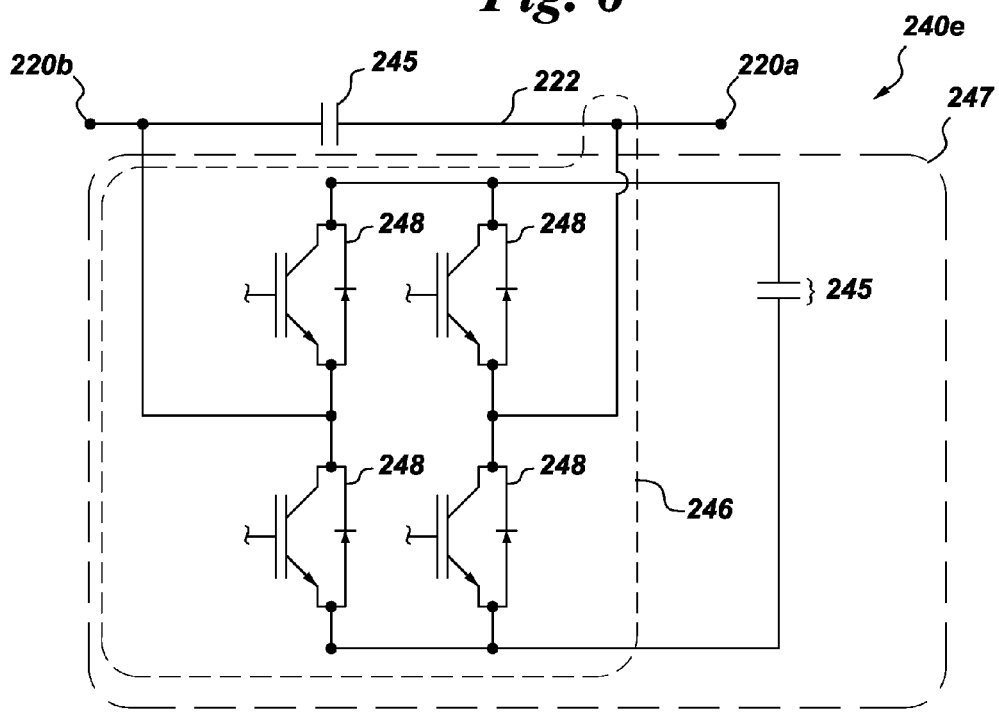
FIG. 7 illustrates a signal injection module useful according to one or more embodiments of the present invention.

Referring to FIG. 7, the figure represents a variation of the signal injection module illustrated in FIG. 6. In the embodiment shown, signal injection module 240e is configured for direct series injection of a probe signal into transmission cable 222 but lacks the induction coil filtering element featured in FIG. 6. Signal injection module 240e comprises direct injection circuitry 246 and energy storage circuitry 247 and is linked directly to controller transmission cable 222. Optional filter elements include only transmission cable line capacitor 245. A second capacitor 245 is a component of energy storage circuitry 247 and sources the electrical power for the signal injection through signal injection circuitry 246. In the embodiment shown, a plurality of IGBTs 248 provide for probe signal voltage and frequency control.

Figure 8:
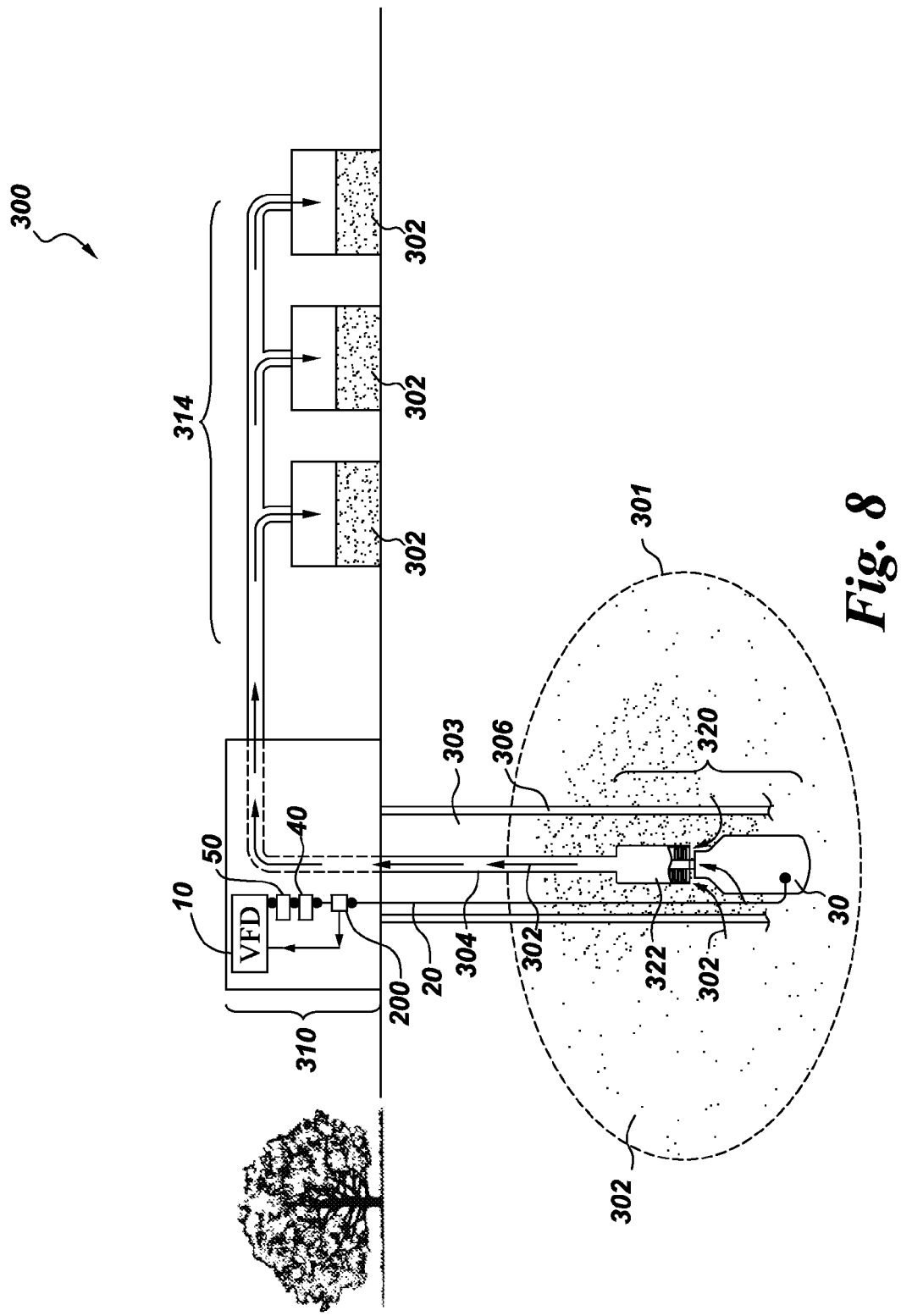
FIG. 8 illustrates an application of one or more embodiments of the present invention.

Referring to FIG. 8, the figure represents a system and method 300 provided by the present invention for producing a geologic fluid 302 from a geologic reservoir 301. The geologic fluid may be any useful geologic fluid resource, for example a hot fluid such as steam, water or a mixture of steam and liquid phase water extracted from a geothermal reservoir. In one or more embodiments, the geologic fluid is a hydrocarbon-containing fluid from a hydrocarbon reservoir; for example a multiphase fluid comprising gaseous and liquid hydrocarbons.

In the embodiment shown in FIG. 8, motor-pump combination 320 is disposed within a wellbore 303 lined by well casing 306. The well bore and casing penetrate a production zone of a geologic reservoir 301. In the production zone, the well casing is perforated allowing the geologic fluid to enter the well bore. In the embodiment shown, geologic fluid 302 is driven by pump section 322 through fluid conduit 304 to a surface storage facility 314. In one or more embodiments, pump-motor combination 320 is an electric submersible pump comprising a permanent magnet motor. In an alternate set of embodiments, the electric submersible pump comprises an induction motor. In the embodiment shown, the electric motor is sourced by a variable frequency drive 10 through power cable 20. The variable frequency drive and allied components; low pass filter 50 and transformer 40, together with a controller 200 provided by the present invention constitute a surface electrical network 310 linked to the electric submersible pump via power cable 20.

The foregoing examples are merely illustrative, serving to illustrate only some of the features of the invention. While the figures illustrate primarily single phase alternating current (AC) systems, polyphase systems fall within the scope of the invention as well. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A controller configured to interface with a variable frequency drive and a motor, the controller comprising:
    (a) one or more voltage and current sensors configured to interface with a power line linking the variable frequency drive and the motor; and
    (b) a signal interface module configured to receive one or more electrical signals associated with an operating condition of the motor from the one or more voltage and current sensors, the signal interface module being configured to correlate the received electrical signals with a rotor position of the motor, and to transmit signals corresponding to rotor position or operating commands, to the variable frequency drive.

2. The controller according to claim 1, wherein the motor is a permanent magnet motor.

3. The controller according to claim 1, wherein the motor is an induction motor.

4. The controller according to claim 1, wherein the signal interface module is configured to generate one or more sinusoidal controller output signals.

5. The controller according to claim 1, wherein the signal interface module is configured to generate one or more quadrature controller output signals.

6. The controller according to claim 1, wherein the signal interface module comprises a digitizer and is configured to generate one or more digital controller output signals.

7. The controller according to claim 1, further comprising a signal injection module configured to inject a probe signal into the power line linking the variable frequency drive and the motor.

8. The controller according to claim 7, wherein the signal injection module comprises a switching network and a direct, capacitive, or inductive power line coupling.

9. The controller according to claim 7, wherein the signal injection module is configured for one or more of direct series injection, direct parallel injection, parallel inductive signal injection, series inductive signal injection, and parallel capacitive signal injection, individually or in combination.

10. The controller according to claim 9, further comprising at least one filter configured to prevent transmission of injected signals to the variable frequency drive.

11. The controller according to claim 9 comprising at least one band stop filter.

12. The controller according to claim 1, wherein a signal transmitted by the signal interface module to the variable frequency drive comprises rotor position data.

13. The controller according to claim 1, wherein a signal transmitted by the signal interface module to the variable frequency drive comprises variable frequency drive operating commands.

14. A system comprising:
a variable frequency drive linked via a power line to a motor; and
a controller interfacing with the variable frequency drive and the motor, the controller comprising:
(a) one or more voltage and current sensors interfaced with the power line linking the variable frequency drive and the motor;
(b) a signal interface module configured to receive one or more electrical signals associated with an operating condition of the motor from the one or more voltage and current sensors, the signal interface module being configured to correlate the received electrical signals with a rotor position of the motor, and to transmit signals corresponding to the rotor position or operating commands to the variable frequency drive.

15. The system according to claim 14, wherein the motor is a permanent magnet motor.

16. The system according to claim 14, wherein the motor is an induction motor.

17. The system according to claim 14, wherein the motor is a component of an electric submersible pump.

18. The system according to claim 14, further comprising a filter and a transformer disposed between the variable frequency drive and the controller.

19. The system according to claim 14, wherein the controller further comprises a signal injection module configured to inject a probe signal into the power line linking the variable frequency drive and the motor.

20. The system according to claim 14, wherein a signal transmitted by the signal interface module to the variable frequency drive comprises rotor position data.

21. The system according to claim 14, wherein a signal transmitted by the signal interface module to the variable frequency drive comprises variable frequency drive operating commands.

22. A method of operating a motor driven by a variable frequency drive, the method comprising:
(a) receiving at a signal interface module of a controller interfaced with the variable frequency drive and the motor, one or more electrical signals associated with an operating condition of the motor from one or more power line voltage and current sensors interfaced with a power line linking the variable frequency drive and the motor, the signal interface module being configured to correlate the received electrical signals with a rotor position of the motor, and to transmit signals corresponding to the rotor position or operating commands to the variable frequency drive; and
(b) changing one or more operating parameters of the variable frequency drive in response to the signal transmitted by the controller to the variable frequency drive.

23. The method according to claim 22, wherein the motor is permanent magnet motor.

24. The method according to claim 22, wherein the motor is an induction motor.

25. The method according to claim 22, wherein the motor is a component of an electric submersible pump.

26. The method according to claim 22, wherein a product of the method comprises a hydrocarbon fluid.

* * * * *